Patented Jan. 20, 1953

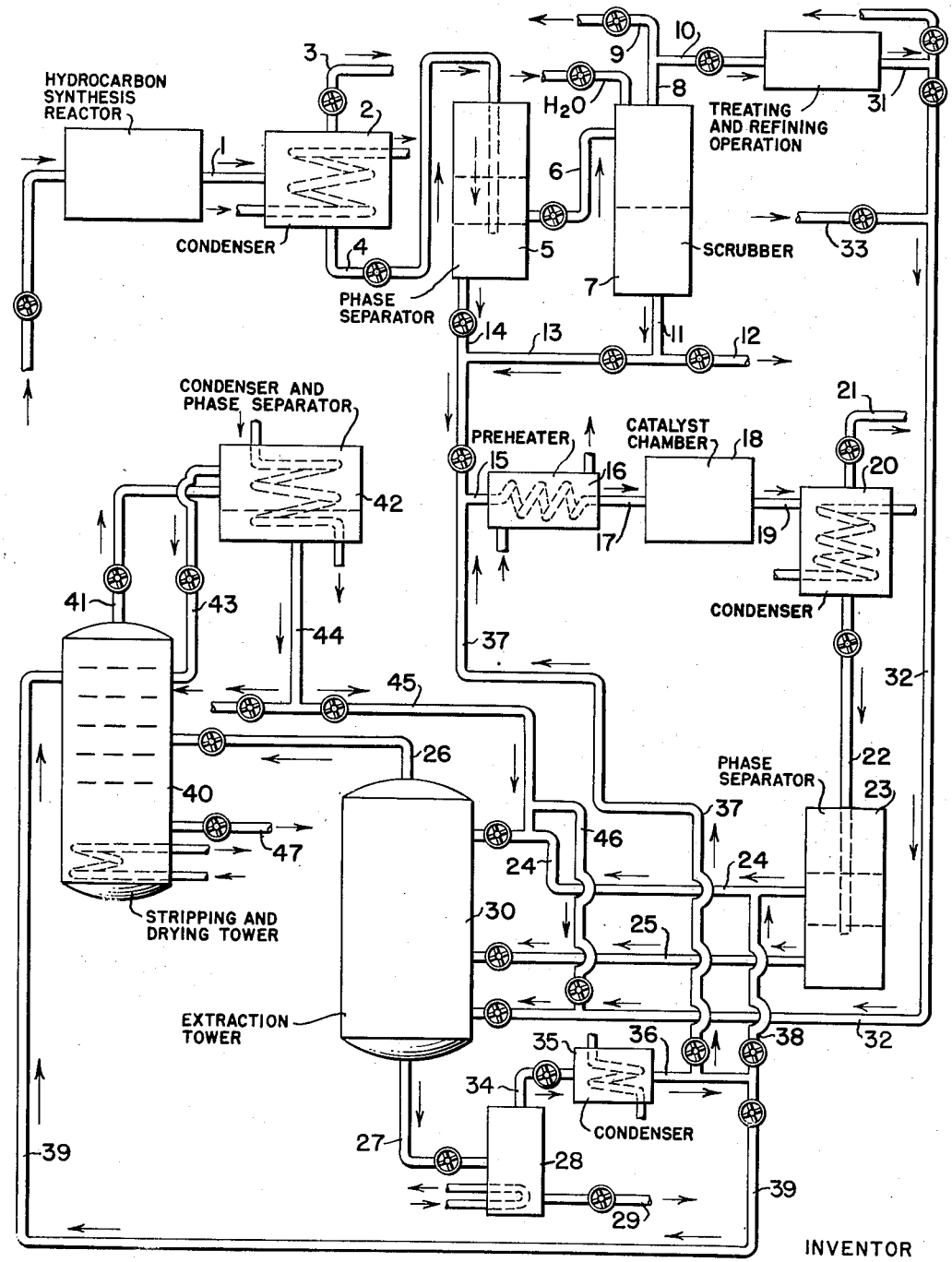

2,626,209

UNITED STATES PATENT OFFICE 2,626,209

PRODUCTION OF COMPOUNDS FOR FUEL MIXTURES

Charles E. Morrell, Westfield, N. J., assignor to Standard Oil Development Company, a corporation of Delaware Application December 28, 1948, Serial No. 67,679

2 Claims. (Cl. 44—77)

This invention relates to a process for converting an aqueous mixture of oxygenated organic compounds to products suitable for incorporation into blends with hydrocarbons which can be employed as fuels for internal combustion engines.

Aqueous mixtures of the type under consideration may be obtained from a diversity of sources including hydrocarbon oxidation and especially the hydrogenation of carbon monoxide to yield hydrocarbons and oxygenated compounds. The so-called Fischer-Tropsch synthesis process, or Fischer process, is an example of the latter type in which a mixture of carbon oxides or carbon monoxide alone is reacted with hydrogen over iron-containing catalysts to produce hydrocarbons and oxygenated organic compounds of a wide range of molecular weights.

It is generally desirable to carry out the above-mentioned Fischer process so that a maximum yield of gasoline or heating oil hydrocarbons is obtained. Under such conditions the hydrocarbon products predominate over the oxygenated compound products. Upon reaction of a mixture of carbon oxides and hydrogen in the presence of an iron catalyst and subsequent cooling of the reaction products, there is recovered a gaseous phase consisting largely of unconverted gases and low boiling hydrocarbons, an oil or hydrocarbon layer comprising a mixture of hydrocarbons and oxygenated compounds, and a water layer containing the more highly water-soluble portions of the oxygenated compounds produced. The oxygenated compounds present in both the water and oil layers are exceedingly complex in nature, including a wide variety of types such as ketones, aldehydes, ethers, acetals, ketals, esters, carboxylic acids, and primary, secondary, and tertiary alcohols of a wide range of molecular weights.

All the individual compounds belonging to each of these types are distributed between the hydrocarbon and water layers in the Fischer process products. The distribution ratio, for any given compound, between these two layers is highly dependent upon the molecular weight as well as upon the type of the compound. At a given molecular weight level, alcohols and acids are more highly water-soluble than the other classes of compounds and hence have distribution ratios favoring the water layer as compared to the hydrocarbon layer. As the molecular weight increases, however, all types of compounds tend to become more hydrocarbon-soluble and hence to have distribution ratios favoring the hydrocarbon layer. Generally speaking, the lower molecular weight oxygenated compounds, especially the alcohols, acids and aldehydes, are recovered predominantly in the water layer with only relatively small amounts being present in the hydrocarbon layer. Considerable percentages of the propyl and higher alcohols, however, are recovered in the oil layer. The lower molecular weight oxygenated compounds present in the oil layer can be recovered or extracted therefrom by the use of water or aqueous solvents. The compounds so recovered are generally of the same type and molecular weight range as those normally present in the water layer and may be combined therewith for the purposes of this invention.

It is possible to separate and purify the oxygenated compounds, including both those normally recovered in the water layer, and those extractable from the oil by aqueous solvents, for use as solvents and chemical intermediates. Under certain conditions, however, it is more desirable to include these oxygenated compounds in motor fuels, thereby increasing the overall gasoline production of the synthesis operation. The water-soluble oxygenated compounds can, of course, be dehydrated without substantial change in chemical composition by appropriate drying agents or by the use of azeotropic distillation methods. When completely freed of water by such dehydration methods they can generally be incorporated in gasolines for use in internal combustion engines. This method for utilizing oxygenated compounds as gasoline components encounters a number of difficulties in practice, however. In the first place, difficulties are sometimes encountered in obtaining complete solubility of the oxygenated compounds in the gasoline, which is predominantly of the hydrocarbon type, especially if small amounts of water are present in the oxygenated compound fraction as a result of incomplete dehydration. In the second place, even if a homogeneous mixture is obtained, it is very sensitive to small amounts of water and tends to separate into two phases even on contact with moist atmosphere. Gasolines are commonly stored over water and, when such storage facilities are used for mixtures of this type, appreciable loss of the more water-soluble components, especially the alcohols, occurs. Another difficulty arises from the chemical nature of some of the oxygenated compound types. The acidic and ester components tend to cause corrosion in internal combustion engines and also in storage and processing equipment. The aldehydes and acetals tend to undergo oxidation and other deterioration reactions under storage conditions, producing gum and other polymeric materials which are undesirable in motor fuels.

It has also been proposed to overcome certain of these difficulties by catalytically treating the oxygenated compounds, together with the hydrocarbons, with agents such as bauxite, silica-alumina cracking catalysts, clays, etc., to eliminate completely the oxygen from the organic compounds, leaving only hydrocarbons. When applying this type of process to the water-soluble oxygenated compounds, however, one obtains largely low boiling hydrocarbons of 1-5 carbon atoms which are either not suitable for inclusion in gasoline or which can be included to only a very limited extent. In order to convert these lower boiling hydrocarbons to materials suitable for incorporation in gasoline considerable additional processing, for instance, polymerization over acid-type catalysts, is necessary.

It is an object of this invention to provide a simple, effective and improved method for utilizing highly water-soluble oxygenated compounds as gasoline components. It is furthermore an object of this invention to provide a process for converting such oxygenated compounds, chemically, and incorporating the conversion products into a predominantly hydrocarbon gasoline fraction to obtain a motor fuel having little tendency to separate into two phases or decrease appreciably in volume on contact with water in storage. It is the further object of this invention to provide a simple and effective process for converting oxygenated compounds such as acids, aldehydes, and acetals, normally not suitable as gasoline components, to materials capable of being utilized as gasoline components. In general, all these objectives may be obtained on mixtures of oxygenated compounds, regardless of the complexity, and without greatly increasing the volatility by abnormal and excessive elimination of oxygen from the oxygenated compounds.

A very superior method has been found for the conversion of various mixtures of highly water-soluble oxygenated compounds having limited usefulness in fuel compositions to hydrocarbon-soluble compounds which can be added directly to gasoline or other fuels. Broadly this method consists in the catalytic treatment of such mixtures under special catalytic conditions which are particularly adapted to producing more desirable products for inclusion in commercial fuels. These more desirable products comprise various mixtures of chemical components largely of the ketone type, such materials in general showing quite satisfactory hydrocarbon solubilities and storage stability properties and giving good engine performance upon combustion as a fuel.

A typical analysis of the composition of a water layer obtained in the Fischer type process is as follows:

Water _____ 90.1 weight per cent.
Alcohols _____ 3.7 weight per cent.
   Methyl
   Ethyl
   Isopropyl
   Tertiary butyl
   Normal propyl
   Secondary butyl
   Isobutyl
   Normal butyl
   Normal amyl
   Secondary amyl
   Tertiary amyl
   Isoamyl Aldehydes _____ 1.0 weight per cent.
   Acetaldehyde
   Propionaldehyde
   n-Butyraldehyde
   Normal valeraldehyde
   Isovaleraldehyde
Ketones _____ 0.6 weight per cent.
   Acetone
   Methyl ethyl ketone
   Methyl propyl ketone
   Methyl isopropyl ketone
   Methyl normal butyl ketone
   Methyl isobutyl ketone
   Diethyl ketone
Esters _____ 0.1 weight per cent.
   Ethyl acetate
   Normal propylacetate
   Ethyl propionate
Acids _____ 4.5 weight per cent.
   Acetic
   Propionic
   Butyric
   Valeric
Hydrocarbons _____ Trace
Ethers _____ Trace
Ketals _____ Trace
Acetals _____ Trace The major portion of these materials contain less than ten carbon atoms, and predominantly, less than 5-6 carbon atoms. Oxygenated compounds of more than ten carbon atoms are generally found in the oil layer of the Fischer synthesis products because of their oil and water solubility relationships.

The process of the present invention for conversion of such aqueous mixtures to hydrocarbon-soluble materials, particularly useful for incorporation in motor fuels, is well-adapted to the treatment of the water layer from the Fischer synthesis. The process may also be applied to the oil layer which contains some oxygenated compounds having less than ten carbon atoms, usually in the range of six to seven carbon atoms. In this case, the oxygenated compound-oil mixtures may be fed directly to the catalytic conversion process or an appropriate scrubbing operation procedure may be carried out, for example, using water to separate the oxygenated compounds and to obtain them as a water mixture which then may be subjected to the conversion process.

Still another source of these aqueous mixtures of oxygenated organic compounds is in the products of hydrocarbon oxidation where frequently both oil and water layers are obtained, each of which contain oxygenated organic compounds.

Various mixtures of the compounds described above which have had the water either partially or totally removed may also be advantageously employed as starting feed stocks for conversion to compounds of high utility in fuel compositions.

In carrying out the process of this invention, the feed stock which may contain a wide variety of compounds, including alcohols, acids, aldehydes, esters, acetals, ketals, and the like, is passed in the vapor phase, over a solid ketonizing catalyst, which may be any one or a mixture of materials. Preferably, said catalyst is a mixture which includes substances ordinarily known as dehydration catalysts, but in this process the catalyst effects mainly a splitting out of carbon dioxide and hydrogen. This catalyst may contain oxides or iron, thorium, aluminum, zinc, chromium, cadmium, manganese, tin, nickel, cobalt, and copper. It is also highly desirable to have present at least one alkali or alkaline earth metal combined in the form of its oxide, carbonate, borate, silicate, or phosphate. Metal halides may also be present. Of special value are the iron-manganese oxide and zinc oxide mixed catalysts. These are preferably employed with calcium or barium silicate, phosphate or oxide. Magnesium and aluminum oxides may also be used in conjunction with iron or zinc oxides.

The catalysts may be suspended or supported on some type of carrier as, for instance, porous carbon, spongy iron metal, silicates, or carbonates.

The catalyst may be employed in a fixed bed reaction system wherein the feed stock is passed over or through the bed of catalytic material. In some cases it may be much more advantageous to use the fluidized solid technique for contacting the solid catalyst particles with the gaseous feed stock.

The use of a fluidized solids catalyst is especially useful where there is just such a problem of intimate contact between a solid and a gas. Such a problem exists in carrying out this reaction, and this kind of operation can be employed using apparatus in which the solid catalysts are powdered and kept in a fluidized state by introduction of suitable gases and even by the flow of the reaction vapors. The injection of stripping gases at the appropriate points to remove the unconverted reactants and products is helpful and can be carried out in the usual manner.

It is preferred to carry out the catalytic conversion of these oxygenated compounds to valuable fuel constituents by passing them over the catalysts together with controlled amounts of steam although the presence of steam in the reaction zone is not absolutely necessary and an overwhelming excess is to be avoided as unnecessary and giving separation difficulties. It is desirable that the ratio of steam to oxygenated feed stock employed within the reaction zone be at least one to one on a molal basis and a higher ratio up to 30 to 1 is better. Optimum ratios of steam to oxygenated compounds appear to be in the range of 3/1 to 20/1. Free oxygen or air in limited amounts may also be introduced into the reaction zone if desired.

The conversion reaction may be carried out at atmospheric pressures with satisfactory results. Super-atmospheric pressures may also be employed. A contact time of 0.1 to 10 minutes is used.

The temperature range required is rather high but not unduly critical. Temperatures of from 360°–600° C. can be used, the optimum temperature depending somewhat on other operating conditions and in particular, it will depend on the composition of the feed stock and on the completeness of conversion required for the feed stock being employed.

It is entirely possible to adjust operating conditions such that there is a very high conversion of the oxygenated compounds of the feed stock to ketones by means of one pass in contact with the appropriate catalysts. In fact, operation at these optimum conditions is to be regarded as the most desirable from the standpoint of economics of production.

However, recycling of a part or all of the unconverted feed stock is possible and in some cases may actually be necessary to obtain maximum yields. It is also considered within the scope of this process that when employing a feed stock high in water content, this water percentage itself may be somewhat adjusted by concentration and used as the source of steam for producing the catalytic conversion of the oxygenated organic compounds to oil-soluble mixtures useful for adding to fuel compositions.

The products which are obtained in this process are mainly those of the ketone type and will show varying molecular weights ranging from $C_3$ upwards to $C_{12}$–$C_{13}$, the exact composition of the product depending on the material being fed to the conversion reaction zone and on the conditions employed in the operation. The oxygenated compounds of the feed stock, while in general not completely deoxygenated, are much more compatible with gasoline and such fuel mixtures than were the original oxygenated water-miscible mixtures of the feed stock.

It is most important to convert the aldehydes and acids, if any, in the original feed stock to the ketonic bodies. In case the feed stock has been depleted of acids before its introduction into the catalytic conversion zone, the conditions need be adjusted primarily to cause conversion of the aldehydes since under those conditions, they will be the most objectionable materials present. Various of the higher alcohols and particularly those of the secondary and tertiary type, are hydrocarbon-soluble and are not harmful when included in fuel compositions and may therefore be allowed to go along with the ketones to be incorporated into gasoline mixtures. If substantial amounts of acids are present in the starting feeds, reaction conditions will require adjustment to the point where these materials are converted to ketones.

These ketonic products from the conversion zone may be separated from the reaction mixture, after total or partial condensation, by any number of methods or combination of methods. In general, the resulting final mixture will contain substantial amounts of water. The ketones may be isolated by distillation, either straight fractionations or by some modified form of it. Since the ketones are relatively more soluble in hydrocarbon type solvents than in aqueous type solvents, an oil extraction can be employed to advantage, especially if the hydrocarbon extraction solvent is used later as the motor fuel containing the extracted ketonic bodies.

The source of the oil used for this extraction is not limited and it can, in fact, be a synthetic oil fraction, a cracked gasoline, a polymer gasoline, or even a virgin naphtha stock. It should preferably have certain desirable characteristics. These include the following:

1. The oil should be free of unstable, corrosive, and highly water-soluble components. If the oil layer of a synthesis fraction is employed for this purpose, it should be pretreated with bauxite, $SiO_2$–$Al_2O_3$ or clay. This type of treatment accomplishes a number of results including improvement of the octane number by olefin isomerization, and removes from the oil certain unstable oxygenated components which tend to cause corrosion when present in fuels.

2. The extraction oil should have an initial boiling range of 40°–250° C., and preferably 50°–130° C., especially in order to obtain the maximum of water entrainment during subsequent drying of the extraction mixture.

This method for working up the reaction mixture by an oil extraction is of particular value when the ketones are to be incorporated directly into fuel compositions since the reaction mixture can then be extracted with, for instance, a petroleum hydrocarbon fraction boiling in the gasoline range, the hydrocarbon oil extract dried, and used directly as a fuel containing the ketones which have been extracted from the reaction mixture by the hydrocarbon fraction.

If the ketone products are to be used for energy-producing purposes, it may be desirable to treat them further either alone or combine them with other oil-soluble oxygenated fractions and subject the mixtures to a catalytic reaction over acid, hydrous oxide type catalysts such as bauxite, clay, silica-alumina, tungsten oxide, thorium oxide, activated alumina, phosphoric acid, and the like, at elevated temperatures such as 300°–600° C. Considerable reaction such as condensation and deoxygenation of the ketones occurs under these conditions and there is formed from them hydrocarbons boiling in the gasoline and higher ranges.

The invention will be understood in more completeness by reference to the following example:

As a specific embodiment of this invention, a water layer obtained by the Fischer synthesis process and having the typical analysis given above, is subjected to the following conversion to give good yields of ketonic products having increased hydrocarbon miscibility.

A mixture of carbon oxides, predominantly carbon monoxide, and hydrogen of the type known as synthesis gas is subjected to the usual Fischer synthesis process using iron-containing catalysts under conditions such that the gaseous mixture is thereby converted to a mixture of hydrocarbons and oxygenated organic compounds. In mixtures so produced, the hydrocarbon fraction predominates over the oxygenated compound products.

Referring now to the drawing (in which the single figure is a flow diagram of a preferred mode of the invention) a mixture of the gaseous products is passed continuously by line 1 to a condenser 2 from which there is removed by overhead line 3 an uncondensed gaseous fraction. This overhead fraction is composed of unconverted gases and low molecular weight hydrocarbons which may, if desired, be subjected to other treatment such as polymerization by proper catalysts to a gasoline fraction. From condenser 2, there is removed by outlet line 4, a liquid mixture, which is passed by line 4 to a continuous phase separator 5 wherein the mixture separates into two layers, a lighter oil or hydrocarbon phase which comprises a mixture of hydrocarbons and some dissolved oxygenated compounds, and an aqueous layer which contains the more highly water-soluble oxygenated compounds. These oxygenated compounds which are present in both the layers formed in the phase separator 5 consist of ketones, aldehydes, ethers, acetals, ketals, esters, carboxylic acids, and alcohols, of wide variety of molecular weights as shown above by the analysis of Fischer products. The condensing and phase separating operations may be combined into one operational step, if desired. The upper oil or hydrocarbon phase is removed by line 6 to a water scrubber 7 in which the oil layer is contacted countercurrently with a water wash in order to remove, to a large extent, any remaining water-soluble oxygenated materials which are present. Two phases will be formed in this scrubbing operation. The washed oil is removed by line 8 and a part or all of it passed by line 10 to various oil treating and refining operations including such steps as bauxite treatment and fractionation. A part of the oil may be removed for other purposes by line 9. From the lower portion of phase separator 5 through line 14, there is removed a water layer containing the major proportion of the water-soluble, oxygenated compounds. This aqueous layer may be passed by lines 14 and 15 directly to the preheater 16 and thence, by line 17, to the catalyst chamber 18, or it may be combined with all or a part of the aqueous wash liquid from scrubber 7. This aqueous wash liquid from scrubber 7, which also contains certain dissolved oxygenated compounds, is removed from the lower portion of scrubber 7 by line 11. A part or all of the wash may be passed via line 13 to line 14 and thence to the preheater and catalyst converter zone. A part may be removed by line 12. If desired, the ratio of water to oxygenated compound may be adjusted such as by concentration, partial volatilization and fractionation or by a combination of such methods or by any other suitable means before passing the aqueous feed liquid by line 15 into preheater 16. The water and oxygenated compounds are vaporized in preheater 16 and passed into the catalyst chamber 18 wherein the mixture of steam and oxygenated compounds at ratios of approximately 20 to 1 are contacted with the preferred catalyst consisting of a bed of mixed iron and manganese oxides maintained at temperatures of from 360°–600° C. and most desirably at approximately 500° C.

The product gases are removed from the catalyst chamber by line 19 and passed to a condenser 20. Fixed gases and any uncondensable products are passed overhead by line 21. From condenser 20 by means of line 22, there is removed a mixture which is passed to a phase separator or settler 23. The upper water-insoluble layer which is formed in the phase separator 23 is passed by line 24 to the upper portion of an extraction tower 30. The lower aqueous layer containing water-soluble oxygenated compounds is passed into an intermediate point of extraction tower 30 by means of line 25. A gasoline fraction, for instance, such as is obtained by refining and treating the oil fraction of the Fischer synthesis process, is passed by lines 31 and 32 into the lower portion of extraction tower 30. Alternatively, any hydrocarbon fraction of suitable boiling range and having the other necessary properties may be passed into the extraction tower 30 by lines 32 and 33. Obviously various mixtures of Fischer synthesis oil fractions and hydrocarbon fractions from other sources may also be used to advantage as the extractive oil for recovery of the hydrocarbon-soluble products from the aqueous layer obtained from the catalytic conversion zone.

Extraction tower 30 is operated under such conditions of feed control, temperature and pressure, that there is continuously removed overhead by line 26 an oil or hydrocarbon fraction enriched in oxygenated compounds which were produced by the catalytic conversion and having relatively high hydrocarbon solubility. From the lower section of extraction tower 30, by line 27, there is removed a water fraction containing relatively small amounts of oxygenated compounds, particularly unextracted acetone and unconverted water-soluble alcohols. This fraction is passed to a suitable heated distilling tower 28 having sufficient fractionating action to separate an aqueous volatile overhead stream containing the acetone and unconverted alcohols while through line 29 there may be removed liquid higher boiling materials which are undesirable for further ketonizing treatment. This stream is liquefied by condenser 35 and may be handled in a number of alternate ways, depending on its composition and the relative economics of the various recycling operations. For example, the condensate may be taken by lines 36 and 37 back to line 15 and recycled back through the vaporizer and catalyst chamber in order to resubject the oxygenated compounds to conversion. Or, a part or all of the fraction may be passed through lines 36, 38, and 24, and again subjected to extraction in tower 30. Small amounts of this aqueous mixture containing oxygenated compounds may be introduced into an upper portion of the stripping and drying tower 40 by lines 36 and 39.

The oil or hydrocarbon fraction enriched in hydrocarbon-soluble components which is removed from the upper part of extraction tower 30 by line 26, is introduced into a stripping and drying tower 40 which is heated by a suitable heating coil. The overhead volatiles consisting of oil, water, and volatile oxygenated compounds are taken by line 41 to a combined condenser and phase separator 42 from which the upper hydrocarbon layer is refluxed back to the stripping tower via line 43. The water layer containing the more water-soluble compounds is removed by line 44 and may, if desired, be recycled by lines 45 and 24 to the upper portion of the extraction tower 30 or a part may be carried by lines 45, 46 and 32, into a lower portion of the tower.

From the lower section of tower 40 by line 47 there is removed the dried hydrocarbon fraction containing increased quantities of hydrocarbon-soluble oxygenated compounds. This fraction can be employed as a fuel for internal combustion engines or can be further treated and fractionated to yield the fuel compositions. By operating in this manner, the water mixture of oxygenated organic compounds is converted to highly useful products having much increased hydrocarbon miscibility.

In cases where the ratio of water to oxygenated compounds in the mixture fed to the catalyst converter zone is relatively high, that is, cases where little or no water is removed from the aqueous layer of the Fischer synthesis product before subjecting it to this conversion process, an alternative recovery process may be more desirable. Thus, a portion and preferably, a major portion, of the water emerging from the catalytic zone can be removed from the oil and oil-soluble products by a phase separation of the water fraction. The water fraction thus obtained is subjected to distillation and only the volatile overhead therefrom combined with the separated oil fraction, at the same time discarding or recycling a large portion of the lean water bottoms from the distillation. The wet oil fraction containing the major portion of the oxygenated compounds can then be taken directly to an azeotroping or extractive distillation tower operated in conjunction with a hydrocarbon extraction step. A dry gasoline fraction enriched in the oxygenated compounds can then be recovered directly from the extractive step.

What is claimed is:

1. A vapor phase catalytic process for preparing fuel mixtures containing hydrocarbon-soluble ketones which comprises contacting one part of a mixture of water-miscible, oxygenated organic compounds including alcohols, aldehydes, ketones, esters, and carboxy acids having up to ten carbon atoms admixed with three to twenty parts of steam per part of said oxygenated organic compounds present therewith on a molal basis at temperatures of 360°–600° C. with a solid ketonizing catalyst consisting essentially of mixed iron oxides and manganese oxides, whereby the water-miscible organic compounds are substantially converted to ketones, condensing the vaporous products, extracting the aqueous liquid product so obtained with a hydrocarbon fraction thereby removing the hydrocarbon-soluble ketone components produced in the catalytic reaction, and drying the hydrocarbon extract containing the ketones to give fuel compositions.

2. A process for preparing fuel mixtures containing hydrocarbon-soluble ketones, which comprises the steps of separating a liquid product from the catalytic reaction of carbon monoxide and hydrogen into an oil layer and a water layer containing oxygenated organic compounds including alcohols and aldehydes, vaporizing and contacting said aqueous phase with a catalyst containing essentially iron oxides and manganese oxides at temperatures of 360°–600° C. thereby catalytically converting said oxygenated organic compounds in said aqueous phase into hydrocarbon-soluble ketones, condensing and separating the resulting catalytic conversion product into an aqueous phase and an oil phase, and extracting the resulting ketones from the aqueous phase by contact with the combined said oil layer and said oil phase.

CHARLES E. MORRELL.

REFERENCES CITED

The following references are of record in the file of this patent:

UNITED STATES PATENTS

| Number | Name | Date |
| --- | --- | --- |
| 1,315,525 | Morton | Sept. 9, 1919 |
| 1,704,732 | Eisenhut et al. | Mar. 12, 1929 |
| 1,873,537 | Brown et al. | Aug. 23, 1932 |
| 1,961,912 | Querfurth | June 5, 1934 |
| 2,010,066 | Dreyfus | Aug. 6, 1935 |
| 2,015,094 | Woolcock | Sept. 24, 1935 |
| 2,264,427 | Asbury | Dec. 2, 1941 |
| 2,457,257 | Michael et al. | Dec. 28, 1948 |
| 2,516,958 | Coley | Aug. 1, 1950 |

FOREIGN PATENTS

| Number | Country | Date |
| --- | --- | --- |
| 268,735 | Great Britain | Feb. 11, 1927 |
| 860,383 | France | Jan. 13, 1941 |